United States Patent [19]
Jezo

[11] 3,742,496
[45] June 26, 1973

[54] PRECISION DME COMPATIBLE WITH TACAN

[75] Inventor: Maurice L. Jezo, Cedar Grove, N.J.

[73] Assignee: International Telephone and Telegraph Corporation, Nutley, N.J.

[22] Filed: Jan. 7, 1971

[21] Appl. No.: 104,688

[52] U.S. Cl. ............................ 343/6.5 R, 325/141
[51] Int. Cl. ............................................. G01s 9/56
[58] Field of Search ................... 343/7.3, 6.5 R, 6.8; 325/141

[56] References Cited
UNITED STATES PATENTS
3,418,581  12/1968  Kennedy et al. ................. 343/6.5 R Primary Examiner—Benjamin A. Borchelt
Assistant Examiner—G. E. Montone
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

This invention relates to distance measuring equipment compatible with existing tactical air navigation systems. A first sharp pulse and a second rounded pulse replace the standard first and second rounded pulses of existing systems. The first sharp pulse improves distance accuracy in two ways. The decision level is reached sooner and the crossing of the decision zone is shorter. The second rounded pulse provides for the required adjacent channel rejection.

2 Claims, 3 Drawing Figures

Patented June 26, 1973

SHORT RISE-TIME PULSE STANDARD TACAN PULSE

INVENTOR
MAURICE L. JEZO
BY
ATTORNEY

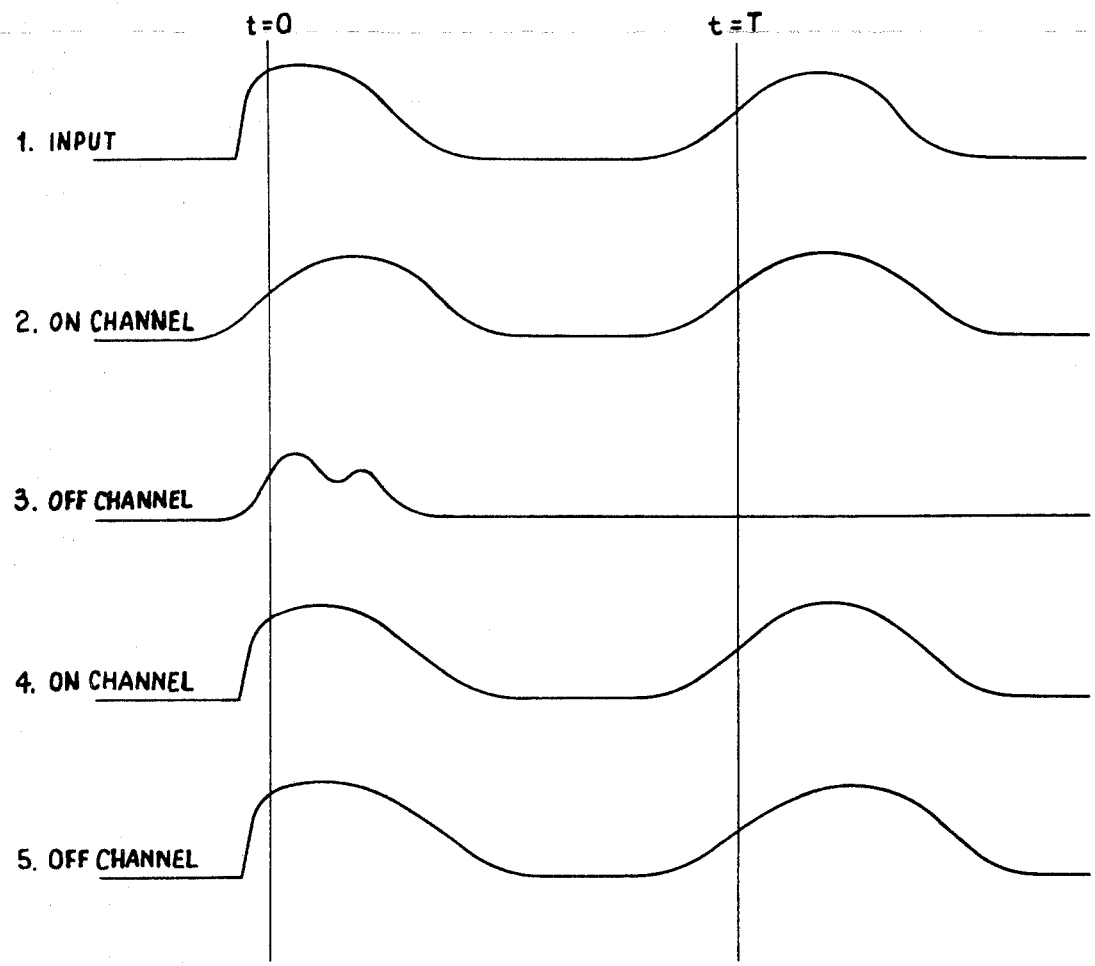

PRECISION DME COMPATIBLE WITH TACAN

BACKGROUND OF THE INVENTION

The present invention relates to distance measuring equipment and more particularly to precision distance measuring equipment compatible with existing tactical air navigation (TACAN) systems as described in MIL-STD 291B.

It is known that much of the distance error in a TACAN system comes from the slow rising TACAN pulse compounded with wide variations in amplitude of the interrogations. It is also known that distance accuracy could be improved if pulses with short rise times were utilized. Sharp pulses would improve the distance accuracy in two ways. The decision level is reached sooner and the crossing of the decision zone is shorter. As a result, the leading edge is free from echos, and any variation in the decision level will produce a smaller distance error. Only the rise time has to be short; the fall time has no effect on distance accuracy and can be chosen to optimize other characteristics.

The use of sharp pulses is presently unacceptable because present TACAN systems provide for 252 adjacent MHz frequency channels, and the broad spectrum of sharp pulses results in adjacent channel interference. Since TACAN is an existing and standard system, any major alteration of the standard signals or introduction of new signals must be well justified and compatible with existing systems.

SUMMARY OF THE INVENTION

It is an object of the present invention to increase the level of distance accuracy which can be achieved by existing TACAN systems within the framework of existing channel bandwidth allocations.

It is a further object that the invention be compatible with standard existing TACAN systems.

According to a broad aspect of the invention there is provided an improved apparatus for measuring the distance between a first transmitter-receiver and a second transmitter-receiver of the type wherein a decoder in said first transmitter-receiver accepts pulse pair interrogation signals having a predetermined spacing between pulses from said second transmitter-receiver and responds with a pulse pair reply signal, and wherein the signals transmitted lie in a predetermined frequency channel, where each of said first and second transmitter receivers further includes means for generating pulse pair signals, each pulse pair having a sharp first pulse and a rounded second pulse, and means for detecting said sharp pulse and said rounded pulse to provide high system accuracy and adjacent channel rejection.

The above and other objects of the invention will be more clearly understood from the following detailed description and reference to the accompanying drawings, in which:

BRIEF DESCRIPTION OF THE DRAWINGS

FIG. 3 shows waveforms appearing at various points in FIG. 2.

DESCRIPTION OF THE PREFERRED EMBODIMENTS

Figure 1:
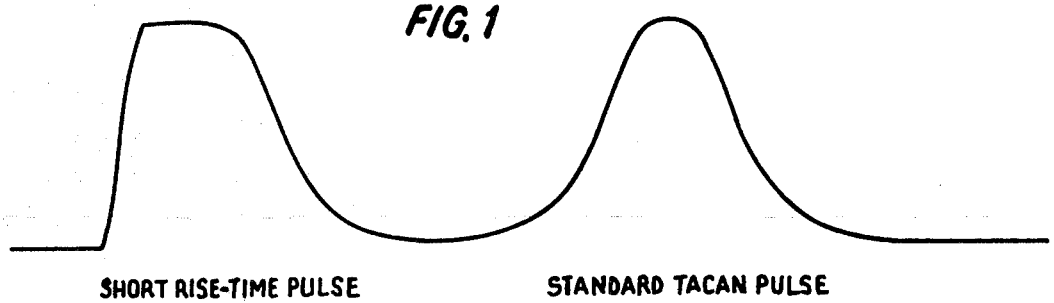
FIG. 1 shows a pulse pair waveform having a sharp first pulse and a rounded second pulse.
Figure 2:
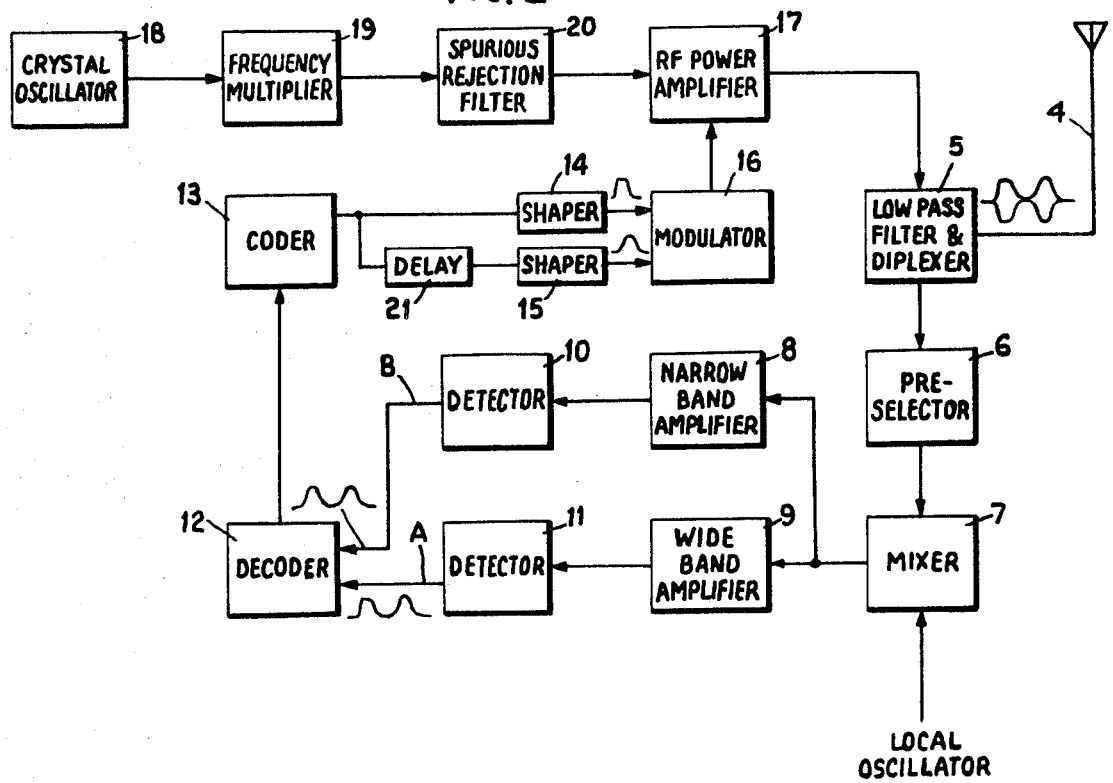
FIG. 2 is a block diagram of a DME transponder incorporating the invention.

Interrogation signals of the type shown in FIG. 1, containing a sharp first pulse with a short rise time and a rounded second pulse representing the standard TACAN pulse are intercepted by antenna 4 and fed to preselector 6 via low pass filter and diplexer 5 as shown in FIG. 2. The output of preselector 6 is fed to mixer 7 which has one input coupled to a local oscillator. The output signal from mixer 7 has a frequency which is equal to the difference between the frequency of the local oscillator and the frequency of the output signal of preselector 6. This difference signal is simultaneously applied to narrow band amplifier 8 and wide band amplifier 9 and is shown in line 1 of FIG. 3. The outputs of amplifiers 8 and 9 are each detected in detectors 10 and 11 respectively, and their waveforms shown in FIG. 3.

It can be seen that the first pulse which contains high frequency components will pass through narrow band amplifier 8 and appear at point B as a rounded pulse. However, due to the wide spectrum characteristic of the sharp pulse, it will be passed, although distorted, through amplifier 8 on the adjacent channels. The second pulse of the input pulse pair passes undistorted, ON channel, through narrow band amplifier 8 and detector 10; the resulting waveform shown in line 2 of FIG. 3, being two rounded pulses. The second pulse will not pass through the narrow band path on the adjacent channels due to the inherent narrow band characteristics of the amplifier 8. The waveform appearing at point B is shown in line 3 of FIG. 3. If the spacing T between the pulses appearing at point B equals a predetermined value, a coincidence will be detected by decoder 12. However, no coincidence can occur on the adjacent channels. Therefore the required adjacent channel rejection has been provided.

Due to the wide band characteristics of wide band amplifier 9 both the first sharp pulse and second rounded pulse will be passed and appear at point A as shown in line 4 of FIG. 3. This will occur ON channel and may also occur on the adjacent channels as shown in line 5 of FIG. 3. If the spacing between the pulses at point A equals a predetermined value, a coincidence will be detected both ON channel and on the adjacent channels. However, the ON channel coincidence due to the pulse pair at point A is verified by the coincidence due to the pulse pair at point B. This verification is not possible on the adjacent channels. After ON channel verification, the first sharp pulse is available for distance measuring purposes from point A. Therefore the required adjacent channel rejection is provided for while the advantage of the sharper first pulse are employed.

When the above described coincidences have been recognized by decoder 12, a signal is sent to decoder 13 which generates a trigger pulse. This pulse is fed to pulse shaper 14, and to pulse shaper 15 via delay 21. Shaper 14 produces a sharp pulse with a short rise time of the type shown in FIG. 1. Sharper 15 produces the corresponding rounded pulse. These signals are combined in modulator 16 and used to modulate the RF energy in RF power amplifier 17 in a known way using a crystal oscillator 18, frequency multiplier 19 and spurious rejection filter 20. The output of amplifier 17 is fed to low pass filter and diplexer 5 which is now in the transmit state. Therefore the reply signal is again a pulse pair having a first sharp pulse and a second rounded pulse.

It is to be understood that the above described invention has been given by way of example only and should not be considered as a limitation upon its scope.

I claim:

1. An improved apparatus for measuring the distance between a first transmitter-receiver and second transmitter-receiver of the type wherein a decoder in said first transmitter-receiver accepts pulse pair integration signals from said second transmitter-receiver and responds with a pulse pair reply signal if the spacing between each pulse pair equals a predetermined value, and wherein the signals transmitted lie in a predetermined frequency channel, where each of said first and second transmitter-receivers further includes:

first means for generating pulse pair signals, each pulse pair having a sharp first pulse and a rounded second pulse; and means for detecting said sharp pulse and said rounded pulse to provide high system accuracy and adjacent channel rejection, said detecting means including:

a first amplifying means coupled to said pulse pair for amplifying said pulse pair;

a second amplifying means coupled to said pulse pair for converting said first sharp pulse to a rounded pulse; and decoding means coupled to said first and second amplifying means for recognizing pulse pairs having said predetermined spacing.

2. An apparatus according to claim 1 wherein said apparatus includes:

second means for generating a trigger pulse in response to a pulse pair interrogation;

a first shaping means coupled to said second generating means for producing said first sharp pulse;

means coupled to said second generating means for delaying said trigger pulse by a predetermined amount;

a second shaping means coupled to said delaying means for producing said second rounded pulse; and means for combining said first sharp pulse and said second rounded pulse to form the desired pulse pair.

* * * * *